Feb. 27, 1934.  W. H. EVANS  1,948,909
FLEXIBLE VENTILATING TUBING OR THE LIKE
Filed Aug. 21, 1931
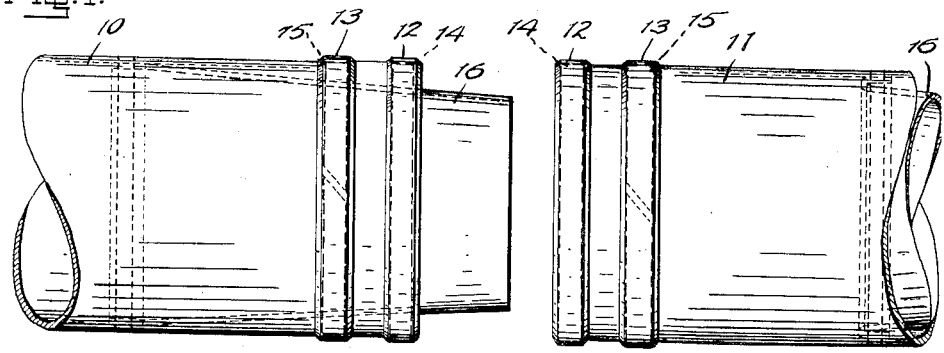
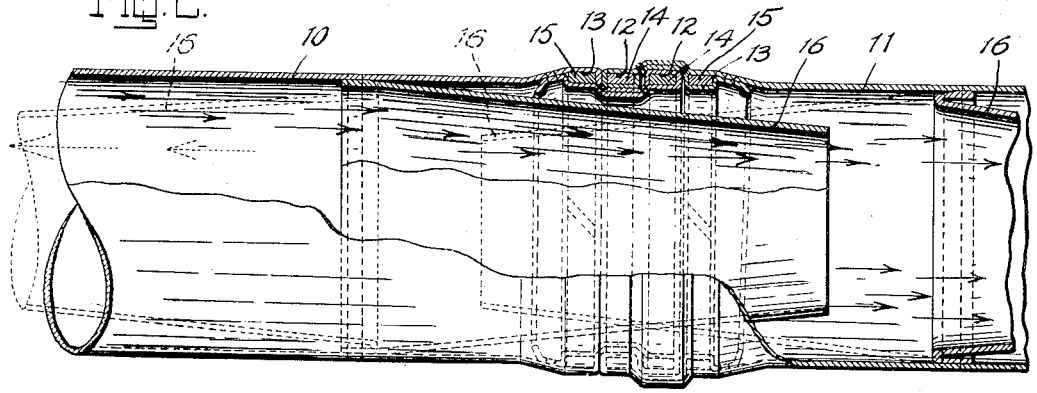
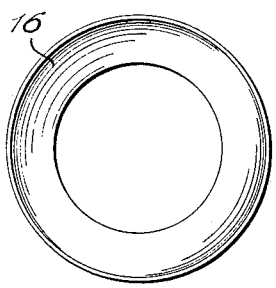
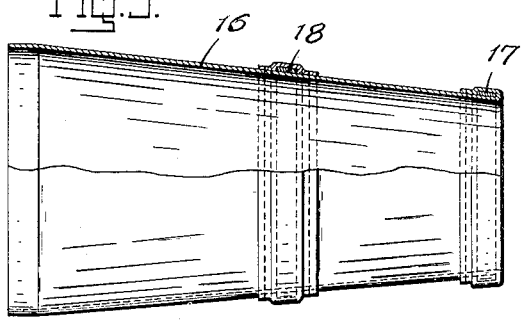
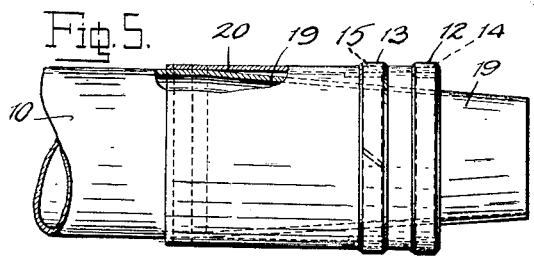
INVENTOR.
WILLIAM HOOPER EVANS.
BY
ATTORNEY.

Patented Feb. 27, 1934

1,948,909

UNITED STATES PATENT OFFICE 1,948,909

FLEXIBLE VENTILATING TUBING OR THE LIKE

William Hooper Evans, Bridgeport, Conn.

Application August 21, 1931. Serial No. 558,489

5 Claims. (Cl. 137—90)

The present invention relates to flexible ventilating tubing, as used for instance in mines, and has for a particular object to provide an improved coupling structure which will greatly lower the resistance to the passage of air through the tubing. Mine ventilating tubing is usually made of flexible material, such as canvas, and is constructed in relatively short length sections for convenience in handling and transportation, a number of these sections being coupled together in the mine to produce any desired length. The usual coupling employed is of such a nature that it produces an annular projection within the tubing, and in long runs, say of a mile or more, these projections add considerable resistance to the flow of the air, causing baffling, eddying and other deterrent effects, so that in order to deliver the air in proper volume and pressure additional power is required.

It is established that in passing through a tube or passage way, the large volume of air toward the outer edges, or contiguous to the wall of the tubing, travels with greater velocity than in the center, so that any obstruction in the path of the outer edge of the air flow will greatly reduce the efficiency of the tubing as a conductor of the air.

It is proposed in the present invention to provide a coupling construction which will stream line the air flow over the coupling projection, eliminating resistance to the velocity pressure, and preventing baffling and eddying of the air currents.

Other objects are to provide a construction which may be economically incorporated as a composite part of the tubing length, and which will not interfere with the coupling together of the tubing lengths in the usual manner.

A still further object is to provide a construction, according to one embodiment of my invention, in which seam obstructions will be entirely eliminated upon the interior of the tubing.

With the above and other objects in view, embodiments of the invention are shown in the accompanying drawing and these embodiments will be hereinafter more fully described with reference thereto, and the invention will be finally pointed out in the claims.

In the drawing:

Fig. 1 is a side elevation showing the adjacent ends of two sections of tubing, according to one embodiment of my invention, and before being coupled together.

Fig. 2 is a view, partly in section and partly in elevation, showing the ends of the tubing sections coupled together.

Fig. 3 is a view, partly in section and partly in side elevation, of the cone shaped sleeve employed.

Fig. 4 is an end view thereof.

Fig. 5 is a side elevation, partly in section, of the end of a tubing section according to a modified form of the invention.

Similar reference characters indicate corresponding parts throughout the several figures of the drawing.

Referring to the drawing the two tubing sections or lengths 10 and 11 illustrated, are of suitable length for convenience in handling and transportation, say 25 feet, and having at each end a coupling element, the coupling element at one end adapted to be interlockingly connected to the coupling element at one end of the adjacent length. While any suitable coupling element may be employed I have illustrated a type disclosed in my U. S. Patent #1,525,538 of February 10, 1925, which comprises two spaced annular pockets 12 and 13, formed by stitching the folded in end of the tubing on itself, the outer pocket 12 having a solid annular ring 14 and the inner pocket 13 having a split ring 15 mounted therein. The coupling of the ends is effected by deforming or flattening one coupling element sufficiently to permit it to be forced endwise into the other element. When thus inserted and released the rings of the inner coupling element will expand and resume their normal annular position, whereupon they are drawn into a position parallel with the rings of the outer coupling element and then pulled apart so that the split rings pass each other. Further pulling causes the split rings to pass the solid rings. This completes the joint, as clearly shown in Fig. 2, the rings holding the joint positively against strains which would tend to pull the tube ends apart, and also preventing accidental displacement.

The joint produces an annular obstruction upon the inner surface of the tubing, which heretofore has resisted the air flow and caused baffling and eddying currents.

Within the end of the tubing section there is provided a tapered flexible sleeve 16, having its larger diameter end secured, as by sewing, in inwardly spaced relation to the coupling element and its smaller diameter end projecting beyond the end of the tubing. The taper of the sleeve is preferably just sufficient to clear the coupling projection, in practice about 3½ degrees. In assembling the coupling elements the sleeve may be pushed back into the tubing out of the way and when air under pressure is forced through the tubing the sleeve will straighten out over the coupling projection, as clearly indicated in Fig. 2. In operation the air will be streamlined over the coupling projection without baffling, eddy currents, or other deterrent effects, and will have smooth uninterrupted flow throughout the line without appreciable loss or reduction of velocity pressure at the coupling points.

In order to provide for the more convenient handling of the sections, I preferably provide the sleeve 16 in each end. This eliminates the necessity for the workman having the right end in place when assembling the section, as both ends will be identical and interchangeable. As shown in Fig. 2 the sleeve in the section 11 will merely act as a continuation of the sleeve in the section 10, the two sleeves acting in series or tandem. Should the direction of flow be reversed the sleeves will automatically reverse their positions, as shown in dotted lines Fig. 2, the sleeve in section 11 being then extended over the coupling projection.

In Figs. 3 and 4 I have shown a form of sleeve having circular stiffening rings 17 and 18 sewed upon the outer side, one at the small end and the other intermediate the ends.

In Fig. 5 I have shown a modification in which the end of the tube section is formed tapered, as at 19, while the coupling elements are provided as a part of a cylindrical sleeve 20 sewed exteriorly of the tube section. In this case the interior of the tubing is entirely free of seams. The operation will be the same as in the first embodiment.

It will be obvious that one or more circular stiffening rings similar to those shown in Fig. 3 may, if desired, be incorporated in the structures shown in Figs. 1, 2 and 5.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:—

1. A flexible ventilating tubing section, having end joint coupling means at each end, and tubular means at one end disposed interiorly of said coupling means and having one end adapted to extend beyond the end of the tubing section, said tubular means being reversible whereby it may be extended in one direction or the other longitudinally of said section.

2. A flexible ventilating tubing section, having end joint coupling means at each end, and tubular means at each end disposed interiorly of said coupling means and having one end adapted to extend beyond the end of the tubing section, said tubular means being reversible whereby they may be extended in one direction or the other longitudinally of said section.

3. A flexible ventilating tubing section, having a flexible tapered nozzle portion at one end, and end joint coupling means exteriorly of said nozzle portion, said nozzle portion being reversible whereby it may be extended in one direction or the other longitudinally of said section.

4. In flexible ventilating tubing, a plurality of flexible tube sections having circumferential relatively stiff coupling means at their ends adapted to couple an end of one section to the end of an adjacent section and to support the ends of said sections in cylindrical form, and a tapered sleeve forming part of one section having its larger diameter end substantially corresponding to the interior diameter of said tubing section and disposed in inwardly spaced relation to the end of said section and its smaller diameter end extending therefrom in the direction of the flow of air through the tubing beyond the end of said section and into the adjacent section, the intermediate portion of said sleeve disposed in the plane of said coupling means being of smaller outside diameter than the inside diameter of said coupling means whereby the flow of air through said sleeve is streamlined past said coupling out of contact therewith.

5. In flexible ventilating tubing, a plurality of collapsible and rollable flexible tube sections having circumferential relatively stiff coupling means at their ends adapted to couple an end of one section to the end of an adjacent section and to support the ends of said sections in cylindrical form, and a collapsible and rollable flexible tapered sleeve forming part of one section having its larger diameter end substantially corresponding to the interior diameter of said tubing section and disposed in inwardly spaced relation to the end of said section and its smaller diameter end extending therefrom in the direction of the flow of air through the tubing beyond the end of said section and into the adjacent section, the intermediate portion of said sleeve disposed in the plane of said coupling means being of smaller outside diameter than the inside diameter of said coupling means whereby the flow of air through said sleeve is streamlined past said coupling out of contact therewith.

WILLIAM HOOPER EVANS.